United States Patent [19]  [11] 4,119,500
Ishizuka et al.  [45] Oct. 10, 1978

[54] PROCESS FOR ELIMINATING MAGNETISM OF SYNTHETIC DIAMOND GRAINS

[75] Inventors: Hiroshi Ishizuka, 19-2 Ebara 6-chome, Shinagawa-ku, Tokyo, Japan; Kazuo Suzuki, Chigasaki; Shinichi Tamon, Fujisawa, both of Japan

[73] Assignee: Hiroshi Ishizuka, Tokyo, Japan

[21] Appl. No.: 817,420

[22] Filed: Jul. 20, 1977

[30] Foreign Application Priority Data

Jul. 19, 1976 [JP] Japan ............................. 51-85159

[51] Int. Cl.$^2$ ............................................. C25D 15/00
[52] U.S. Cl. .................................... 204/16; 51/309 R; 361/267; 423/446
[58] Field of Search .................. 423/446, 460, 461; 361/267; 209/8, 215; 204/16; 51/307, 309

[56] References Cited

U.S. PATENT DOCUMENTS

| 2,878,171 | 3/1959 | Ferrand | 204/16 |
| 3,785,938 | 1/1974 | Sam | 204/16 |
| 3,980,549 | 9/1976 | Grutza | 204/16 |

FOREIGN PATENT DOCUMENTS 45-26,603  2/1970  Japan ...................................... 423/446

OTHER PUBLICATIONS

Ishizuka "Chemical Abstracts" vol. 84, Jan. 12, 1976, 84:7164z.
"Kirk-Othmer Encyclopedia of Chemical Technology" vol. 12, 1967, pp. 780-781.
Phinney, "Science", vol. 120, Jul. 16, 1954, p. 114.

Primary Examiner—Edward J. Meros
Attorney, Agent, or Firm—Frank J. Jordan

[57] ABSTRACT

A process for thermally treating synthetic diamond grains to eliminate magnetism thereof and a diamond grain product obtained by the process, which is suitable for manufacturing electrodeposited diamond tools.

4 Claims, No Drawings

PROCESS FOR ELIMINATING MAGNETISM OF SYNTHETIC DIAMOND GRAINS

The present invention relates to a process for eliminating magnetism of synthetic diamonds and a product treated thereby and more particularly, to a process for thermally treating synthetic diamond particles, grains or chips (to be referred to hereinafter merely as "grains" for the sake of simplicity) to eliminate the magnetism thereof and to a diamond grain product obtained by the process so as to be suitable for manufacturing electrodeposited diamond tools.

The so-called electrodeposited diamond tools manufactured by using an abrasive material or severing element for grinding or cutting hard materials, diamond grains bonded on a tool base according to electroplating or chemically plating Ni, Cu, Sn, Sb or the like metal to be deposited on the tool base, have widely been employed, in view of extremely high grinding or cutting ability.

Hitherto, there has generally been a tendency that natural diamond grains but not synthetic diamond grains have been selectively used for such purpose in spite of the fact that the diamond synthesizing industry has greatly been advanced and there is a disadvantage in the cost and supply stability of natural diamond grains.

The diamond can be synthesized by subjecting graphite powder to a high pressure and high temperature condition to convert the graphite crystal lattice to the diamond one but, in such a case, a quite severe reaction condition is required. Therefore, all of conventional processes for synthesizing diamonds use, as a solvent-catalyst metal, a powdered iron-group metal, usually Co, Ni or an alloy thereof to moderate the synthesizing condition even to some extent. As a result, the synthesized diamond grains inevitably contain some amount of the used solvent-catalyst metal as an impurity which develops magnetism.

If an electrodeposited diamond tool is manufactured by treating in a plating bath a tool base on which conventional synthetic diamond grains are arranged, the plating metal will deposit not only on the tool base in spaces between the diamond grains but also on the surfaces of the diamond grains to reduce grinding or cutting ability of the resulting diamond tool due to the metal layer covering the grinding or cutting surface of each diamond grain and also reduce the strength for holding the diamond grains on the tool base, since at least a part of the plated metal is used not for holding the diamond grains on the tool base but for covering the diamond grains. The drawbacks due to the magnetism make it difficult or rather impossible to use the conventional synthetic diamond grains for manufacturing a desired electrodeposited diamond tool, in which a major part of diamond grains is embedded in a relatively thick plating metal layer to be formed on the tool base and a remaining part only is exposed and protruded from the plating metal layer surface without any deposition of the plating metal thereon to form a sharp grinding or cutting surface of the tool product.

Therefore, a principal object of the present invention is to provide a way for making it possible to utilize synthetic diamond grains with a relatively high magnetism for electrodeposited diamond tools.

A specific object of the present invention is to provide a process for thermally treating synthetic diamond grains of a relatively high magnetism to eliminate the magnetism thereof.

Another specific object of the invention is to provide such synthetic diamond grains as having little or no magnetism and being suitable as a raw material for manufacturing electrodeposited diamond tools.

According to the invention, the above objects and other objects to be appreciated by studying the specification can be attained by treating in an inert atmosphere synthetic diamond grains at a temperature higher than the Curie temperature of the metal contained as an impurity in the raw material diamond grains, adjusting the friability of the thermally treated diamond grains and magnetically separating the resulting diamond grains to obtain demagnetized diamond grains and diamond grains of a relatively low magnetism.

As the raw material diamond grains, it is preferable to use the same having a bulk density of 1.75 to 1.90 gr/cc, although the value may be changed depending on the size used. The magnetic separating step may be carried out prior to the friability adjusting step.

It is preferable to carry out the thermal treatment in vacuo or under nitrogen or the like inert gas stream in an electric furnace set at a temperature between about 800° and about 1300° C. The thermally treated diamond grains are cooled to room temperature in the electric furnace, from which the electric source has been disconnected or after having been discharged from the furnace. It has been found that the cooling speed does not have any influence on the magnetism of the resulting diamond grains but it requires about 30 minutes as the cooling time when the thermally treated diamond grains were left to stand.

The cooled diamond grains may have a thin graphite layer thereon and friability thereof has been reduced due to a difference in thermal expansion coefficients of the diamond and the metal impurity therein and a strain or distortion of the diamond grains per se during the thermal treatment. Therefore, the cooled diamond grains were firstly treated with an oxidizing agent to remove the graphite layer and then treated with a mill to adjust the friability thereof. As the oxidizing agent, chromic acid, perchloric acid or the like for dissolving graphite may be used. As the mill, a ball mill or the like conventional mill may be employed.

For using the resulting diamond grains on electrodeposited diamond tools, it is important that the grains have a friability of 30 to 55 weight %/90 sec. when measured by a method as indicated hereinafter.

The invention will now be further explained with reference to the following examples but please note that values of bulk densities and friabilities as given in the examples are those measured by methods as described in "ANST-B74-17-1971 (American National Standard Test for Bulk Density of Diamond Abrasive Grains)" and L. M. Zsolnay "Physical Evaluation of Diamond Abrasive Grain" DWMI Technical Symposium, Chicago, Sept. 1971, pages 8-1 to 8-4, respectively and that magnetic susceptibilities as given in the examples were culculated based on the following formula.

$$\text{magnetic susceptibility} = \frac{F}{m \frac{dH}{dx}} \text{ (emu/gr)}$$

$F$: force given to sample from magnetic force line (gr)
$m$: weight of sample (gr)
$dH/dx$: magnetic gradient emu: abbreviation of "electromagnetic unit"

EXAMPLE 1

In a receptacle, yellowish synthetic diamond grains containing cobalt as an impurity to show a magnetic susceptibility of 0.17 emu/gr and having a grain size range of 120–140 mesh/in, bulk density of 1.76 gr/cc and friability of 39.8 weight %/90 sec. were charged. After having changed the air in the receptacle to nitrogen gas, the receptacle was placed in an electric furnace and heated at 1150° C. for 20 minutes.

After having cooled to a room temperature, the thermally treated diamond grains were dipped into an aqueous solution of perchloric acid to remove a graphite layer formed on the grains, washed with water and then treated with the use of a ball mill to adjust the friability to 44.0 weight %/90 sec. The resulting diamond grains were subjected to a magnetic separation to obtain diamond grains having magnetic susceptibility of 0.10 emu/gr.

The resulting magnetism eliminated diamond grains were bonded to a tool base with the use of conventional nickel electroplating to obtain an electrodeposited diamond tool. No deposition of the metal was found on each of the diamond grains of the tool.

EXAMPLE 2

Yellowish synthetic diamond grains containing as impurity a relatively large amount of cobalt and having a grain size range of 120–140 mesh/in and friablity of 44–45 weight %/90 sec. were employed as raw material. Having measured the magnetic susceptibility with use of a magnetic balance to obtain a value of 3.00 emu/gr., 100 gr of such diamond grains were charged in a porcelain receptacle, heated at 1150° C. for 30 minutes with the use of an electric furnace while passing thereto nitrogen gas at a rate of 2 1/min and then cooled to a room temperature in the furnace by electrically turning off the furnace.

The thermally treated diamond grains were dipped into an aqueous solution of chromic acid to remove a graphite layer formed on the grains, washed with water and then fed to a magnetic separator to obtain 20 gr of them which had a magnetic susceptibility of equal to or less than 2.05 emu/gr. The resulting diamond grains were treated with the use of a ball mill and recovered as grains having a friablity not exceeding 55 weight %/90 sec.

With use of the resulting diamond grains, an electrodeposited diamond abrasive wheel was prepared and its grinding test was carried out to obtain the following data. For comparison purposes, data of a control electrodeposited diamond abrasive wheel which was prepared with use of synthetic diamond grains not having been subjected to the thermal treatment are also shown.

Plating Conditions:
  Bath Composition

| | |
|---|---|
| $NiSO_4$ | 240 gr/l |
| $NiCl_2 \cdot 6H_2O$ | 45 gr/l |
| $H_3BO_3$ | 40 gr/l |
| pH | 4 |
| Bath Temperature | 45 – 55° C |
| Current Density | 2 – 4 A/dm$^2$ |
| Treating Time | 3 hr |
| Abrasive Wheel obtained: | |
| Size | |
| Diameter | 150 mm |
| Width | 5 mm |
| Central Bore | 50.8 mm (diameter) |
| Thickness of Diamond layer | 1 mm |
| Diamond Concentration | 0.085 cts/cm$^2$ |
| Grinding Conditions: | |
| Apparatus used | A Surface Grinder Type PSG-6E-AV manufactured by Okamoto Machine Tool Works, Ltd., a Japanese corporation |
| Peripheral Speed | 1 500 m/min |
| Grinding Thickness | 0.02 mm |
| Table Feeding Speed | 10 m/min |
| Cross Feeding | 2 mm/pass |
| Material to be ground | WC-Co alloy (Co 5-6 weight %) corresponding to JIS (Japan Industrial Standard) H5501-1953 |
| Result: | |

| | Control | Present invention |
|---|---|---|
| Grinding Rate | 107 | 134 |
| present inveniton / Control | 1 | about 1.25 |

We claim:

1. A process for producing synthetic diamond grains for electrodeposited abrasive tools, comprising the steps of heating in an inert gas atmosphere or in a vacuum synthetic diamond grains which have magnetic susceptibility because of ferromagnetic inclusions to a temperature between about 800° and about 1,300° C., cooling the resulting diamond grains to room temperature, subjecting the cooled diamond grains to a milling action to adjust the friability thereof ranging from 30 to 55 weight %/90 sec., and obtaining diamond grains with decreased magnetic susceptibility having a bulk density ranging from 1.75 to 1.90 g/cc.

2. A process as claimed in claim 1, further comprising the step of chemically treating the thermally treated diamond grains with an oxidizing agent to remove any graphite layer formed thereon during the heating step.

3. A process as claimed in claim 2, wherein the oxidizing agent is selected from the group consisting of chromic acid and perchloric acid.

4. The process of producing electrodeposited synthetic diamond tools comprising the steps of heating in an inert gas atmosphere or in a vacuum synthetic diamond grains which have magnetic susceptibility because of ferromagnetic inclusions to a termperature between about 800° and about 1,300° C., cooling the resulting diamond grains to room temperature, subjecting the cooled diamond grains to a milling action to adjust the friability thereof ranging from 30 to 55 weight %/90 sec., said diamond grains having decreased magnetic susceptibility and having a bulk density ranging from 1.75 to 1.90 g/cc, an electrodepositing said diamond grains on a tool base.

* * * * *